(12) United States Patent
Stewart et al.

(10) Patent No.: US 10,657,588 B2
(45) Date of Patent: *May 19, 2020

(54) METHOD AND SYSTEM FOR FUNDING A FINANCIAL ACCOUNT

(71) Applicant: eFunds Corporation, Jacksonville, FL (US)

(72) Inventors: Whitney Hilton Stewart, Cave Creek, AZ (US); Robert Lawrence Hill, Mill Creek, WA (US); Connie Koep, Rosemount, MN (US)

(73) Assignee: EFUNDS CORPORATION, Jacksonville, FL (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/600,890

(22) Filed: May 22, 2017

(65) Prior Publication Data

US 2018/0096422 A1    Apr. 5, 2018

Related U.S. Application Data

(63) Continuation of application No. 13/476,512, filed on May 21, 2012, now Pat. No. 9,691,101, which is a
(Continued)

(51) Int. Cl.
*G06Q 40/02* (2012.01)
*G06Q 20/10* (2012.01)
(Continued)

(52) U.S. Cl.
CPC .............. *G06Q 40/02* (2013.01); *G06K 7/084* (2013.01); *G06Q 20/02* (2013.01); *G06Q 20/023* (2013.01);
(Continued)

(58) Field of Classification Search
CPC ........ G06Q 40/00; G06Q 20/04; G06Q 20/10; G06Q 40/02; G06Q 20/02; G06Q 20/023;
(Continued)

(56) References Cited

U.S. PATENT DOCUMENTS 5,484,988 A * 1/1996 Hills ...................... G06Q 20/04
235/379
5,689,579 A * 11/1997 Josephson ............ G06Q 20/042
382/137
(Continued)

FOREIGN PATENT DOCUMENTS

EP           0984410 A1 *  3/2000  ........... G06Q 20/042
WO    WO-03083751 A1 * 10/2003  ............. G06Q 20/02

OTHER PUBLICATIONS

Breitkopf, David: BB&T, Star Systems Back Check Truncation, Jan. 23, 2001, American Banker 166 15: 1, pp. 1-4 (Year: 2001).*
(Continued)

*Primary Examiner* — Bijendra K Shrestha
(74) *Attorney, Agent, or Firm* — Finnegan, Henderson, Farabow, Garrett & Dunner LLP

(57) ABSTRACT

A system for generating and processing an electronic funding application is disclosed. The system includes a memory storing instructions and a processor configured to execute the instructions to transmit the electronic funding application to a client and enter financial data into the funding application. The financial data includes a magnetic ink character recognition (MICR) line, a currency amount, and an account identifier. The instructions further transmit the financial data to a server, validate at least a portion of the financial data by comparing a portion of the financial data to data representing valid demand deposit accounts, convert the MICR line to an item compatible with an automated clearing house (ACH) network, and submit the item and the currency amount to the ACH network. The currency amount (Continued)

is transferred from the demand deposit account of the customer to the financial account of the customer.

20 Claims, 14 Drawing Sheets

Related U.S. Application Data continuation of application No. 10/239,906, filed as application No. PCT/US00/42403 on Nov. 30, 2000, now Pat. No. 8,204,812.

(60) Provisional application No. 60/168,272, filed on Dec. 1, 1999, provisional application No. 60/168,273, filed on Dec. 1, 1999, provisional application No. 60/168,276, filed on Dec. 1, 1999, provisional application No. 60/209,476, filed on Jun. 5, 2000, provisional application No. 60/209,446, filed on Jun. 5, 2000.

(51) Int. Cl.
| | | |
|---|---|---|
| *G07F 19/00* | (2006.01) | |
| *G06K 7/08* | (2006.01) | |
| *G06Q 20/02* | (2012.01) | |
| *G06Q 20/04* | (2012.01) | |
| *G06Q 30/02* | (2012.01) | |
| *G06Q 40/00* | (2012.01) | |
| *G06Q 40/06* | (2012.01) | |

(52) U.S. Cl.
CPC ............ *G06Q 20/04* (2013.01); *G06Q 20/042* (2013.01); *G06Q 20/10* (2013.01); *G06Q 30/02* (2013.01); *G06Q 40/00* (2013.01); *G06Q 40/06* (2013.01); *G07F 19/20* (2013.01); *G07F 19/203* (2013.01)

(58) Field of Classification Search
CPC ...... G06Q 20/042; G06Q 30/02; G06K 7/084; G07F 19/20; G07F 19/203
See application file for complete search history.

(56) References Cited

U.S. PATENT DOCUMENTS

| | | | | |
|---|---|---|---|---|
| 6,045,039 | A * | 4/2000 | Stinson | G06Q 20/18 235/379 |
| 6,243,689 | B1 * | 6/2001 | Norton | G06Q 20/04 705/18 |
| 6,289,322 | B1 * | 9/2001 | Kitchen | G06Q 20/04 705/34 |
| 6,301,379 | B1 * | 10/2001 | Thompson | G06Q 20/042 235/379 |
| 6,308,887 | B1 * | 10/2001 | Korman | G06Q 20/18 235/379 |
| 7,653,600 | B2 * | 1/2010 | Gustin | G06Q 20/10 705/39 |
| 7,792,753 | B1 * | 9/2010 | Slater | G06Q 20/04 705/35 |

OTHER PUBLICATIONS

Regal Technologies: Understanding the ACH Network: An ACH Primer, Mar. 15, 2002, Electronic Payment Review and Buyer's Guide, pp. 1-14. (Year: 2002).*

Gamble, Richard H.: History of moving money, Jan. 2002, Independent Banker, 52.1, pp. 1-3 (Year: 2002).*

Cohen et al.: Visa USA's POS Check Service Reduces Merchant Risk, Nov. 13, 2002, Research Note, pp. 1-5 (Year: 2002).*

* cited by examiner

Fig. 6

You are now ready to move funds from your existing checking account into your financial account.

The following information about your existing checking account from which funds will be moved is required for verification.

[Primary First Name / Middle Initial / Last Name] — 605

[Joint First Name / Middle Initial / Last Name] — 640

[Street Address / City / State (Select Below) / Zip or Postal Code] — 610

[Home Phone] — 615

If this number is different than what's on your current check, enter the phone number on your current check. — 645

Enter your check number and the transfer amount.

Then, using your mouse on the keypad below, enter the entire row of numbers and symbols across the bottom of your check.

— 620
PAY TO THE ORDER OF _____ # ____ — 625
_____ DOLLARS
[_____] — 630

*Note: For your benefit, be sure to write "void" on the paper check you have just used to open your new account.*

A separate entry of your checking account number is also required. Please consult your monthly statement or call your checking account provider to ensure accuracy if you are unable to determine your account number.

[_____] — 635

[Continue] 655    [Cancel] 650

Please verify the information you provided about
your existing checking account for accuracy.

To make corrections to this information press the
"Make corrections" button below.

Primary First Name   Middle Initial Last Name — 705

Primary First Name   Middle Initial Last Name — 755

Street Address
City        State    Zip or Postal Code
                     *(Select Below)            — 710

If this number is different than what's on your current check, enter the
phone number on your current check.

Home Phone
(222) 222- 2222  — 715      (333) 333- 3333  — 760

— 720
                                      #☐
                                           — 725
                        ☐ — 730

Checking Account Number: ☐ — 735

To authorize the transfer of funds from your
existing checking account into your new account
press the "Authorize Funds Transfer" button.

[Authorize Funds Transfer] — 740    [Make Corrections] — 745    [Cancel] — 750

700

METHOD AND SYSTEM FOR FUNDING A FINANCIAL ACCOUNT

RELATED APPLICATIONS

This application is a continuation of application Ser. No. 13/476,512, filed May 21, 2012, which is a continuation of application Ser. No. 10/239,906, filed Sep. 26, 2002, which claims the benefit under 35 U.S.C. § 119 of U.S. Provisional Application No. 60/168,272, entitled METHOD AND APPARATUS FOR USE IN ENTERING FINANCIAL DATA INTO AN ELECTRONIC DEVICE, filed on Dec. 1, 1999; U.S. Provisional Application No. 60/168,276, entitled METHOD AND APPARATUS FOR AN ELECTRONIC CHECK PAYMENT SYSTEM, filed on Dec. 1, 1999; U.S. Provisional Application No. 60/168,273, entitled METHOD AND APPARATUS FOR PROVIDING ONLINE FINANCIAL ACCOUNT SERVICES, filed Dec. 1, 1999; U.S. Provisional Application No. 60/209,476, entitled METHOD AND APPARATUS FOR FUNDING A FINANCIAL ACCOUNT, filed on Jun. 5, 2000; and U.S. Provisional Patent Application No. 60/209,446, entitled METHOD AND APPARATUS FOR PROVIDING ONLINE FINANCIAL ACCOUNT SERVICES, filed on Jun. 5, 2000, which are all incorporated herein by reference.

BACKGROUND OF THE INVENTION

This invention relates to a method and apparatus for funding a financial account and, particularly, to an electronic payment system operable to transfer funds from a demand deposit account to a financial account.

In the usual course of opening a financial account, and particularly a demand deposit account, a consumer currently needs to physically visit the bank, savings and loan, or credit union of choice. The consumer provides sufficient personal information to meet the financial institution's needs, e.g., for risk assessment and identity verification. The consumer must also provide funds to be used in opening the account. The consumer is presented with and chooses between various savings and checking account options. The accounts are then "opened" using the consumer's personal information and funds, and the consumer signs a signature card to be used to confirm later transactions. Some accounts can be opened remotely, but these usually involved an exchange of documents and funds by conventional mail or courier.

Once an account is established, the consumer can conduct transactions using the account either in person at the financial institution or through a number of remote means such as automatic teller machines, or a telephone.

SUMMARY OF THE INVENTION

The invention provides a method of electronically funding a financial account from a demand deposit account. The method includes the acts of providing a funding application (e.g., a financial Web site) in electronic form, electronically transmitting the funding application to a customer-operated client (e.g., a personal computer, a hand-held computer, a wireless device, an Internet appliance, etc.), and entering financial data into the funding application. The entered financial data includes a magnetic ink character recognition (MICR) line, a currency amount (e.g., an amount in United States dollars), and an account identifier. The method further includes the acts of electronically transmitting the financial data to a server, validating that at least a portion of the entered financial data corresponds to data relating to the demand deposit account, converting the MICR line to an item compatible with an Automated Clearing House (ACH) network, submitting the item and the currency amount to the ACH network, and electronically transferring the currency amount from the demand deposit account to the financial account.

In one embodiment of the invention, the validating act further includes the act of providing a database including a plurality of records. Each record has at least a portion of a stored MICR line. The validating art further includes the act of searching the database with at least a portion of the entered MICR line. In a second embodiment of the invention, the validating act further includes the acts of providing a database including a plurality of records having a stored account identifier (e.g., an account name, an account address, an account phone number, etc.) respectively, and searching the database with the entered account identifier.

The invention further provides a system for transferring a currency amount from a demand deposit account at a first financial institution to a financial account at a second financial institution. The system includes a customer-operated client. The customer-operated client includes a communications port operable to receive a funding application and to transmit financial data, and an input operable to receive the financial data. The system further includes a server. The server includes a communications port operable to receive the financial data, a memory unit containing at least one database having a plurality of records, and a processor operable to implement at least one software module. The software module validates that at least a portion of the received financial data corresponds to data relating to the demand deposit account, converts the MICR line to an item compatible with an Automated Clearing House (ACH) network, and initiates the ACH process of transferring the currency amount from the demand deposit account to the financial account.

The invention further provides one or more software modules for funding a financial account with funds from a demand deposit account. The software modules fund the financial account by transmitting the funding application to a customer-operated client, receiving financial data from the customer-operated client, validating that at least a portion of the entered financial data corresponds to data relating to the demand deposit account, converting the MICR line to an item compatible with an Automated Clearing House (ACH) network, and transmitting the item and the currency amount to the ACH network to initiate the transferring of the currency amount from the demand deposit account to the financial account.

BRIEF DESCRIPTION OF THE DRAWINGS

FIG. 6 is a diagram of a funding screen generated by the electronic funding system.

FIG. 7 is a diagram of a confirmation screen generated by the electronic funding system.

Before one embodiment of the invention is explained in full detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including" and "comprising" and variations thereof herein is meant to encompass the items listed thereafter and equivalents thereof as well as additional items.

DETAILED DESCRIPTION

Figure 1:
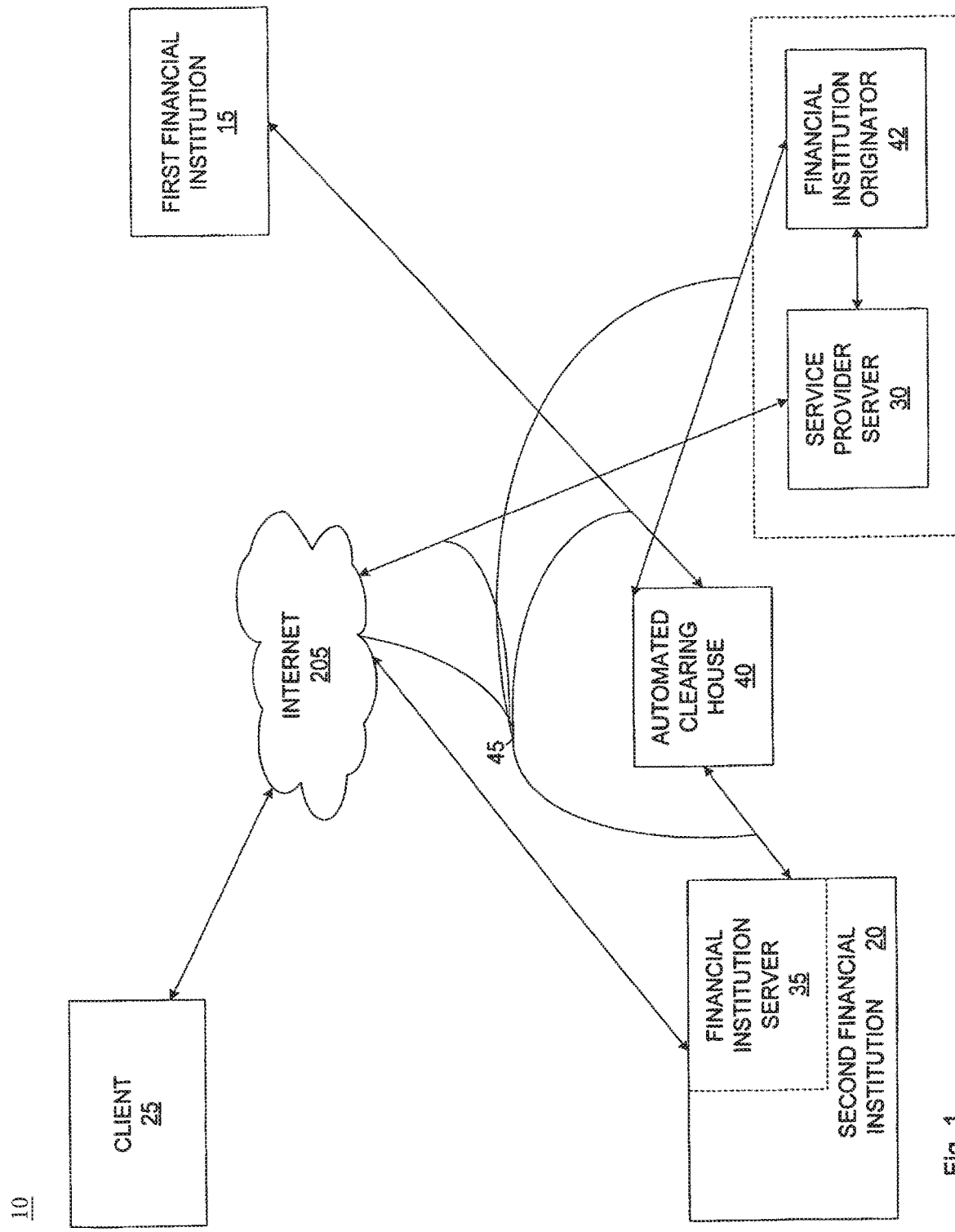
FIG. 1 is a schematic diagram of an electronic funding system embodying the invention.

Schematically shown in FIG. 1 of the drawings is an electronic funding system 10 embodying the invention. The system 10 is for use in electronically transmitting or transferring funds from a demand deposit account (e.g., a checking account) located at a first financial institution 15 to a financial account located at a second financial institution 20. For this description, the demand deposit account is a checking account, however other accounts are possible (e.g., a money market account). Furthermore, the financial account may be implemented as a demand deposit account, a certificate of deposit account, a secure credit offerings account, an IRA account or the like.

Figure 2:
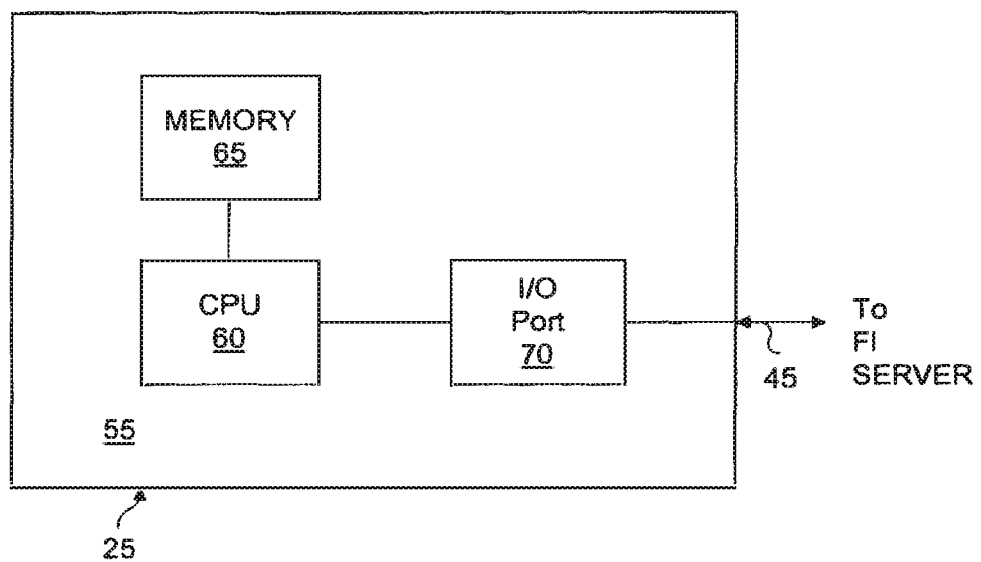
FIG. 2 is a schematic diagram of a client.

Generally speaking, the system 10 includes a client 25, a service provider server 30, a financial institution server 35, an automated clearing house 40, a financial institution originator 42, and a communications network 45. As shown in FIG. 2, the client 25 includes an electronic device 55, which is preferably a personal computer. Alternatively, the electronic device 55 may be a network computer terminal (e.g., a computer point of sale (POS) terminal or an automated teller machine (ATM)), a hand-held PC, an Internet appliance, a wireless device (e.g., a digital phone), or a similar device. Although FIG. 1 shows only one client 25, it should be understood that the system may accommodate connections to multiple clients.

Still referring to FIG. 2, the electronic device 55 includes a central processing unit or processor 60, associated memory 65 (e.g., RAM and ROM), an input/output (I/O) port 70, and a first access program (not shown). The first access program allows the electronic device 55 to communicate with the communications network 45 through the I/O port 70. Preferably, the first access program is any noncommercial or commercial software Web site browser (e.g. MICROSOFT EXPLORER™, AOL™, NETSCAPE NAVIGATOR™, etc.) operable to access a Web site. However, the first access program may be any program operable to receive a funding application or module (such as the financial Web site).

Figure 3:
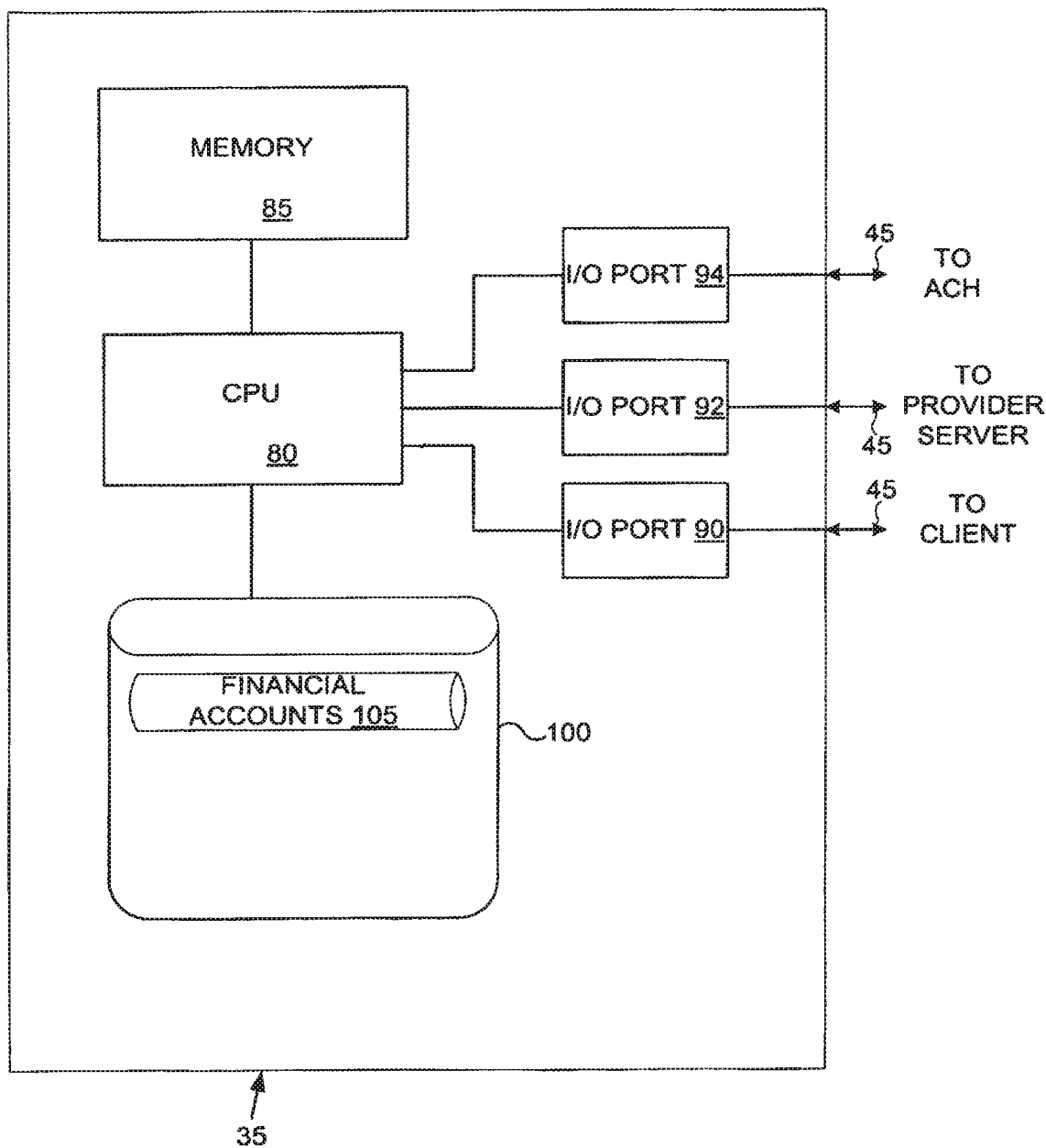
FIG. 3 is a schematic diagram of a financial institution server.

As shown in FIG. 3, the financial institution (FI) server 35 includes a central processing unit 80, associated memory 85, I/O ports 90, 92 and 94, and a second access program (not shown). The second access program allows the FI server 35 to communicate with the communications network 45 through the I/O ports 90,92 and 94. The FI server 35 further includes at least one software module for implementing a funding application. For the embodiment described, the funding application is a financial Web site written in hypertext mark-up language (HTML) and including script written in the JavaScript™ programming language. However, other applications and programming languages may be used with the invention.

The on-line financial Web site allows a customer to create and maintain a financial account which may be used to affect conventional financial transactions as well as for performing electronic or Internet transactions such as purchasing goods and/or services via the Internet. An example of an on line financial account is described in co-pending PCT Application No. PCT/US00/42416, and entitled METHOD AND APPARATUS FOR PROVIDING ONLINE FINANCIAL ACCOUNT SERVICES, filed herewith. One particular aspect of the financial Web site allows the customer to fund their financial account with currency (e.g., U.S. dollars). The user accesses the FI server 35 from the client 25 and receives one or more Web pages for funding the financial account. In a preferred embodiment, the financial account is funded with currency from the checking account located at the first financial institution 15.

The FI server 35 further includes a data storage device 100 having a database of financial accounts 105. Of course, the FI server 35 may include additional central processing units for implementing the financial application and additional data storage devices for storing the database of financial accounts. In addition, a third-party server (not shown) may implement one or more elements of the financial institution server. Furthermore, the system 10 may include additional financial institutions having additional FI servers.

Figure 4:
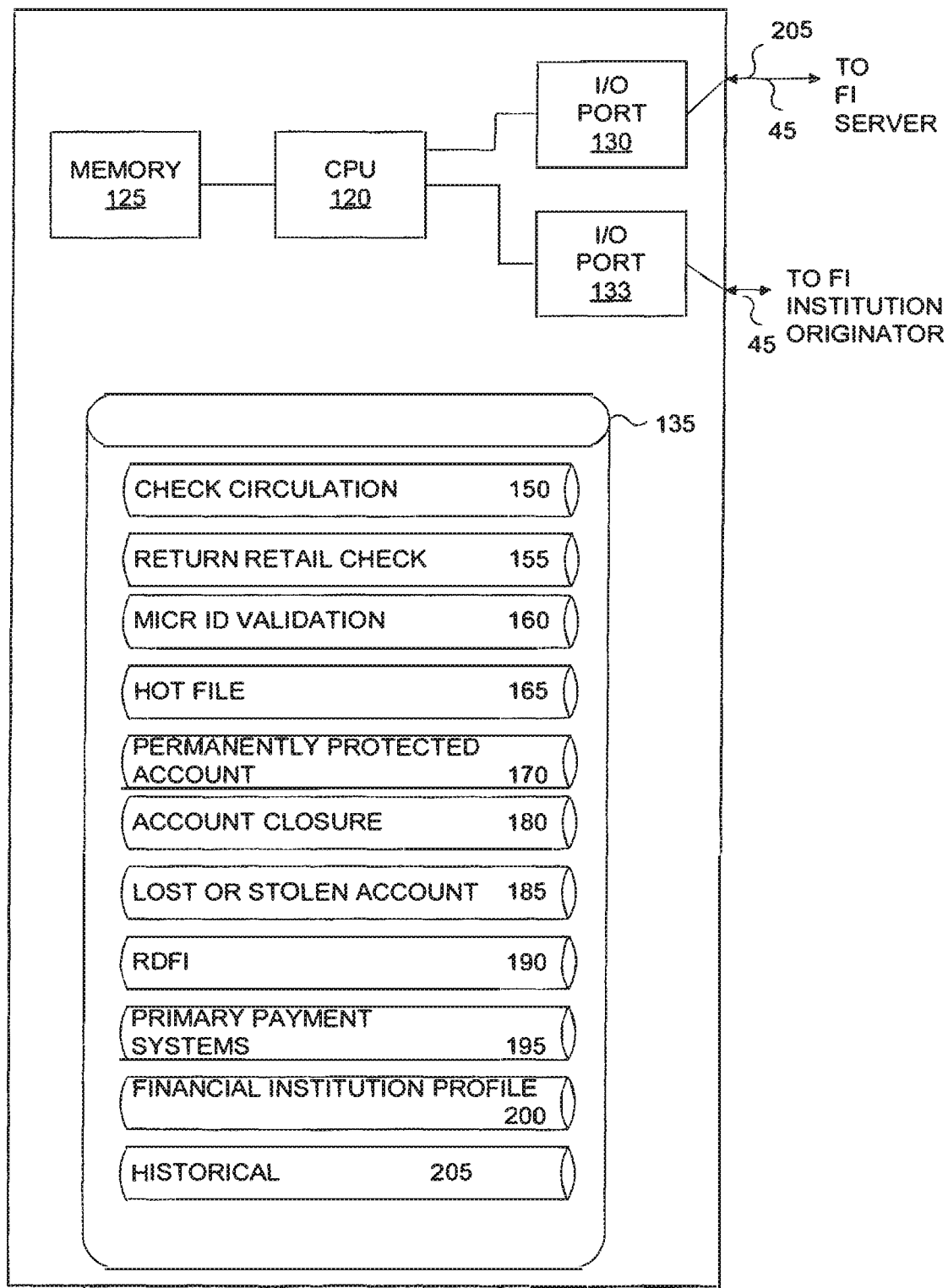
FIG. 4 is a schematic diagram of a service provider server.

As schematically shown in FIG. 4, the service provider server 30 includes a central processing unit 120, associated memory 125, I/O ports 130 and 133, and a third access program (not shown). The third access program allows the service provider server to communicate with the communications network 45 through the I/O ports 130 and 133. The service provider server 30 further includes at least one software module (not shown) for validating the ownership of the entered checking account based on entered financial data, converting an entered MICR line to an item compatible with an automated clearing house (ACH) network, and electronically submitting the formatted data to the ACH operator 40 (FIG. 1) via the financial institution originator 42.

The service provider server 30 further includes a data storage device 135 having databases 150, 155, 160, 165, 170, 180, 185, 190, 195, 200 and 205. The databases 150-205 are implemented with one or more validation or risk assessment filters. A check circulation database 150 contains records of checks currently in circulation by vendors and customers. The records of the check circulation database include the MICR line of the printed checks, the customer's last name associated with the MICR line, the customer's address associated with the MICR line, and the customer's ZIP code associated with the MICR line. In addition, other information may be added including the customer's phone number associated with the MICR line.

A return retail check database 155 contains records of dishonored checks. A MICR ID validation database 160 includes records of routing/transit numbers assigned to financial institutions that are members of the American Banking Association (ABA).

A "hot" file database 165 contains records of MICR numbers that will result in a declination response. The hot file database is provided by the second FI 20.

A permanently protected account database 170 contains records of MICR numbers that have their own account numbers unrelated to the customers who cashed them. They include accounts such as VISA, MasterCard or Discover Card checks, traveler's checks and money orders. For example, a customer may obtain from VISA a check associated with one of VISA's accounts. The check may be used as a promotional tool allowing the customer to "cash" the check and receive money while initiating an account with VISA. The permanently protected account database 170 would include the MICR number associated to the cashable check.

An account closure database 180 contains records of accounts that have been forcibly closed for cause by financial institutions or financial service companies. A lost or stolen account database 185 contains records of demand-deposit accounts that have been reported stolen or lost.

A receiving depository financial institution (RDFI) database 190 contains records of financial institutions that are members of one of the automated clearing house networks. A Primary Payment Systems (PPS) database 195 contains records of account numbers that are closed accounts or non-sufficient funds (NSF).

A Financial Institution profile database 200 contains records regarding the second financial institution 20 and includes the maximum limit for a funding transaction. The maximum limit is set by the second FI 20.

A historical database 205 includes records of each funding transaction performed by the system 10. All transaction data is stored and used for positive and negative verification filters on subsequent transactions. Additionally, the historical database 205 is used to create new filters and to provide a record for the second financial institution 20. The records of the historical database 205 include the MICR line, currency amount, check number and result of the funding transaction. Of course, the historical database records may include additional data. For example, the historical database may track and store data for a velocity measurement filter. The velocity measurement filter records activity level data for the checking account.

In addition to the above database, other databases may be added and not all of the disclosed databases are required. Moreover, the data for the databases disclosed above can be created by the historical database, be provided by the second financial institution or be provided by third parties.

Figure 8:
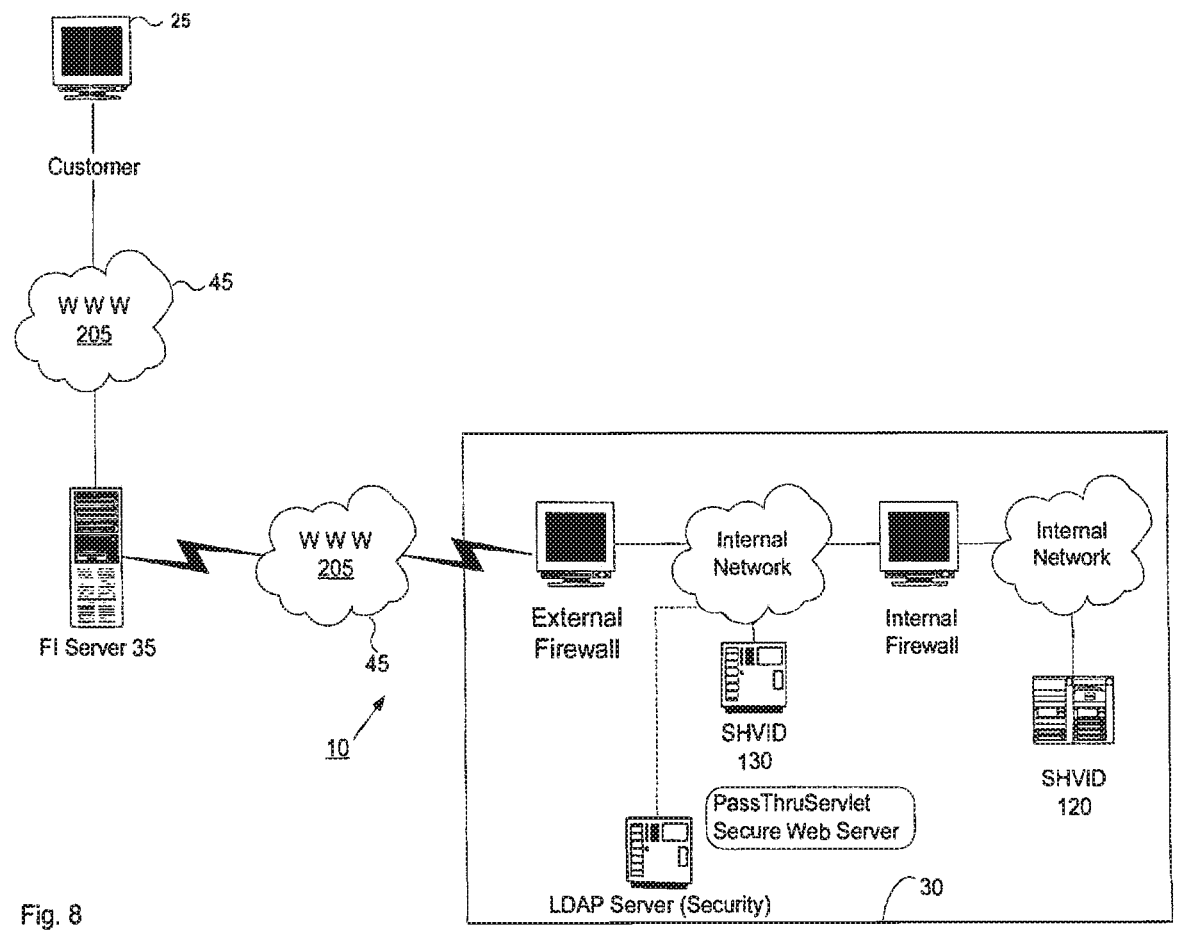
FIG. 8 is a schematic diagram of an electronic funding system embodying the invention disclosing the service provider server in more detail.

Although FIG. 4 shows only one CPU 120, one memory unit 125 and one storage device 135, the service provider server 30 can include additional central processing units (not shown), memory units (not shown) and storage devices (not shown). One embodiment of the service provider server 30 is shown in FIG. 8. In addition, the additional central processing units, associated memory and storage device may be located at more than one physical location. Furthermore, the FI server 35 may include some of the databases disclosed and may implement one or more of the risk assessment or validation filters at the FI server 35.

The communications network 45 includes a plurality of connections, which may be dedicated or non-dedicated connections. For example, the connection between the client 25 and the second financial institution 20 is a non-dedicated connection and is preferably the Internet 205. For another example, the connection between the service provider server 30 and the financial institution server 35 may be a non-dedicated connection (e.g., the Internet 205, an intranet, a wide area network, etc.) or a dedicated connection (e.g., a direct communication line). For a third example, the connections between the financial institution originator 42, and the ACH 40, the first financial institution 15 and the ACH 40, and the second financial institution 20 and the ACH 40 are as dedicated connections. Of course, any of the connections shown may be either a dedicated connection or a non-dedicated connection.

In operation and with reference to FIG. 5, a customer activates the Web site browser at the client 25 allowing the customer to view one or more Web sites from the Internet (act 300). As is commonly known in the art, the browser allows the user to seamlessly transfer to various Web sites of the Internet. In order to use the system 10, the user enters the system address into the browser to access, at act 305, the on-line financial Web site located at the FI server 35.

A first page of the financial Web site is transmitted from the FI server 35 through the network 45 to the client 25 (act 310). After transmission, the Web page is visually displayed by the Web site browser on a monitor for the customer to view. The financial Web site includes multiple web pages, and ideally the customer may seamlessly transfer from the first Web page to these other Web pages. The financial Web site allows the customer to perform financial activities at the on-line financial Web site including the creating, maintaining, and utilizing of one or more financial accounts. For example, the customer may open a financial account, fund the financial account, and electronically purchase goods and services with the funds held in financial account.

When the customer requests to fund the account (act 315), the customer is seamlessly linked to a funding screen 600 (see FIG. 6). The funding screen 600 includes multiple field entry areas 605, 610,615, 620, 625, 630,635, 640 and 645 for receiving financial data from the customer. The financial data includes an amount, a MICR line, and an account identifier (e.g., an account name, an account address, an account phone number, etc.).

At act 320, the customer enters the financial data for the funding transaction into the electronic device 25. As shown in FIG. 6, the customer preferably provides a primary name 605, an address 610, a home phone number 615, a check number 620, a check amount 625, a MICR line 630, and a check account number 635. The MICR line is entered as is disclosed in co-pending U.S. patent application Ser. No. 09/587,738, entitled METHOD AND APPARATUS FOR USE IN ENTERING FINANCIAL DATA INTO AN ELECTRONIC DEVICE, which is incorporated herein by reference. Of course, other data may be entered (e.g., a joint name of the DDA 640, or a second phone number of the DDA 645) and not all data is required. Upon completion of entering the information, the customer can continue the funding transaction or cancel the funding transaction (act 325).

Figure 5A:
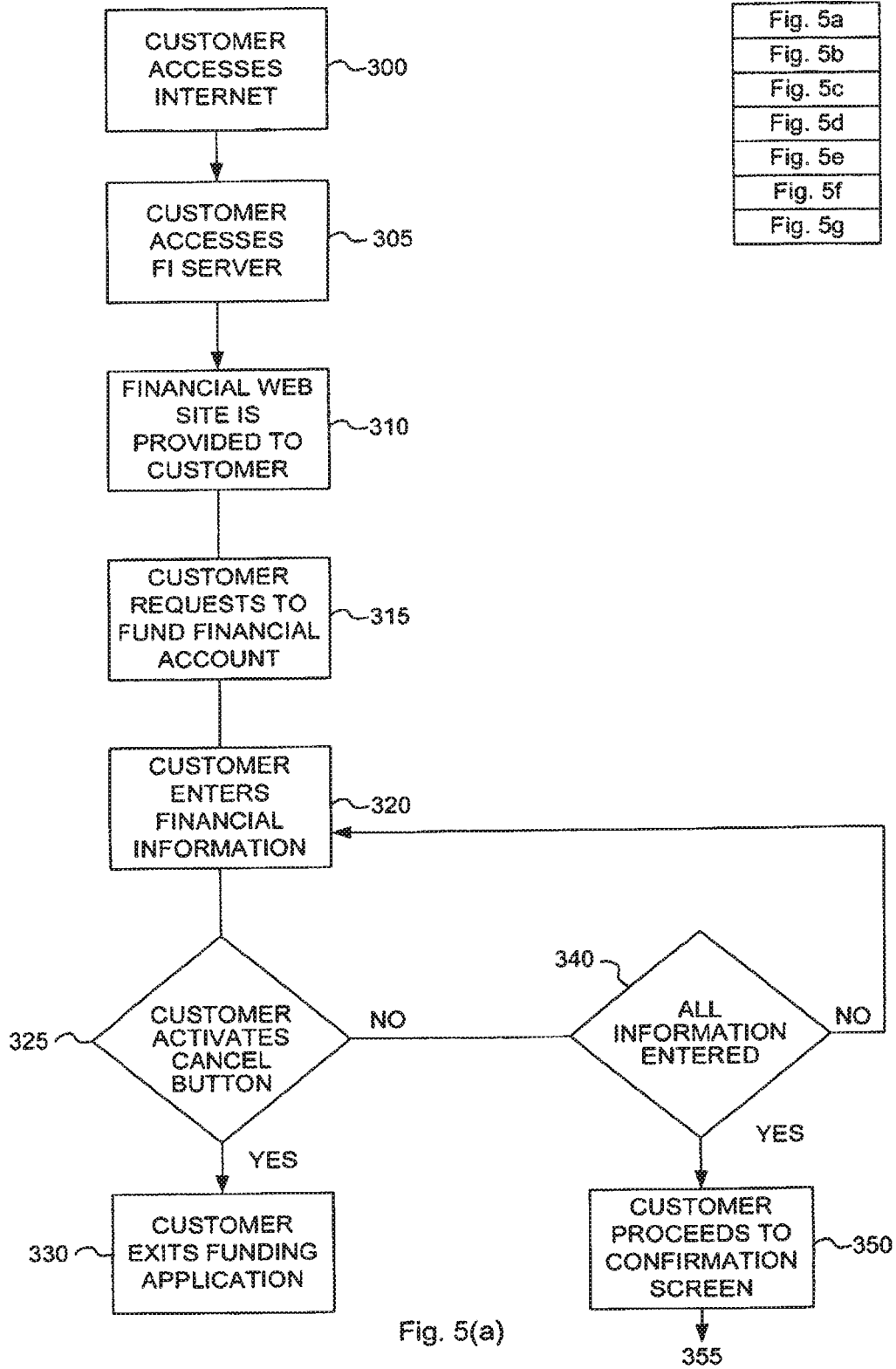
FIGS. 5(a), 5(b), 5(c), 5(d), 5(e), 5(f) and 5(g) are flowcharts of a method implementing the invention.

At act 325 (FIG. 5(a)), the customer can activate a cancel virtual entry button 650 (FIG. 6). If the customer activates the cancel button 650, the customer is seamlessly linked out of the funding application to one of the other on-line financial Web pages (act 330). Of course, other terms or words may be used to label the cancel button and the term "Cancel" is only an example of the many labels that could be used.

In some embodiments, at act 325, the customer can alternatively activate the continue button 655 (FIG. 6). If the customer activates the continue button 655 and if all of the necessary fields requiring data do not contain data (act 340), then the customer is not allowed to continue. If the customer activates the continue button 655 and if all the necessary fields do contain data, then the customer is seamlessly linked to a confirmation screen. Other terms or words may be used to label the continue button 655 and the term continue is only an example label.

At act 350, the customer precedes to a confirmation screen 700 (FIG. 7). As shown in FIG. 7, the confirmation screen displays an entered customer's name 705, an entered customer's address 710, an entered home phone number 715, an entered check number 720, an entered check amount 725, an entered MICR line 730, and an entered check account number 735. At act 355 (FIG. 5(b)), the customer verifies that all the entered data 705-735 was correctly entered. After reviewing the entered data 705-735, the customer may activate an authorize funds transfer virtual entry button 740, activate a make corrections virtual entry button 745, or activate a cancel virtual entry button 750. Other buttons or other entered information (e.g., the entered joint name 755, or the entered second phone number 760) may be added to the confirmation screen as needed.

Figure 5B:
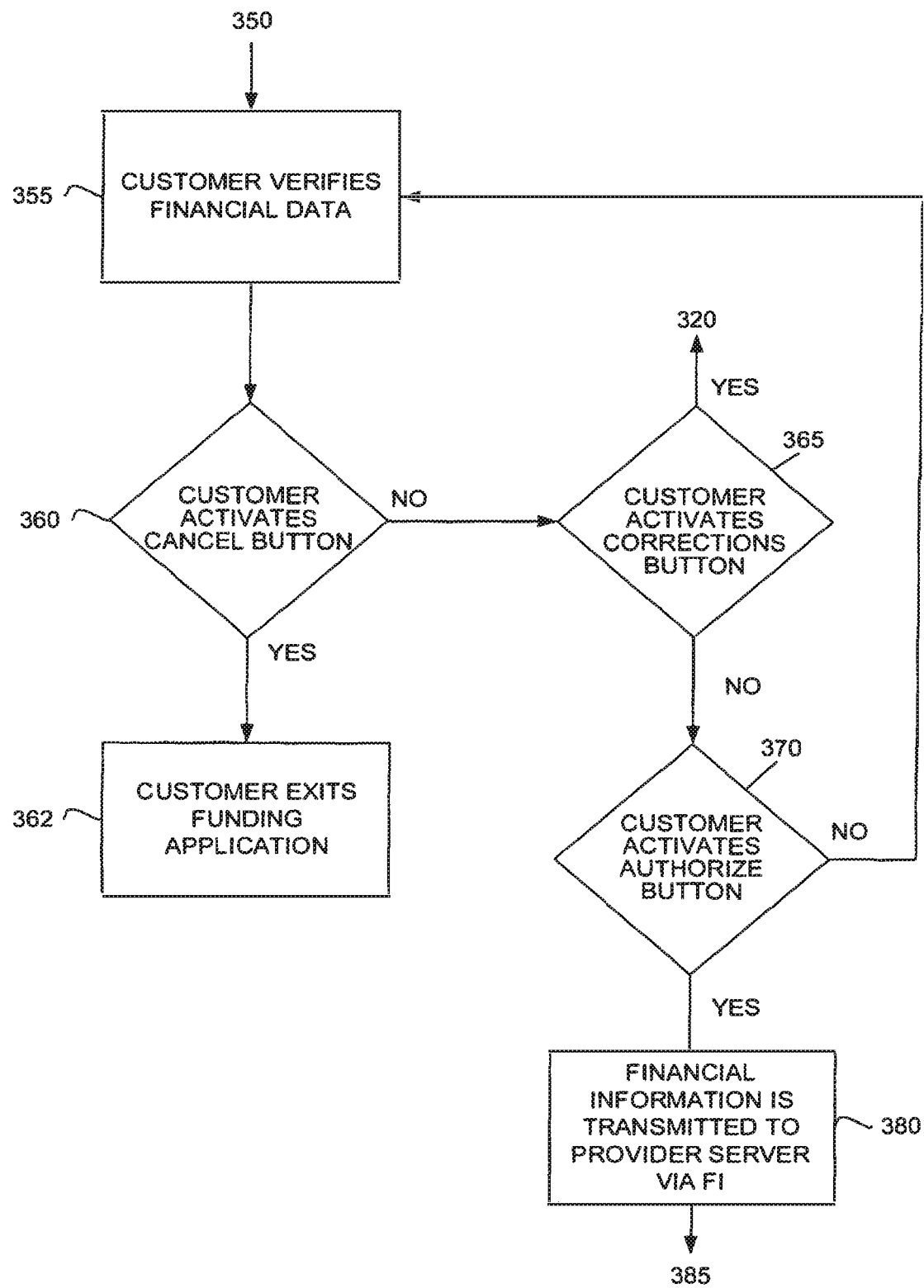
Figure 5C:
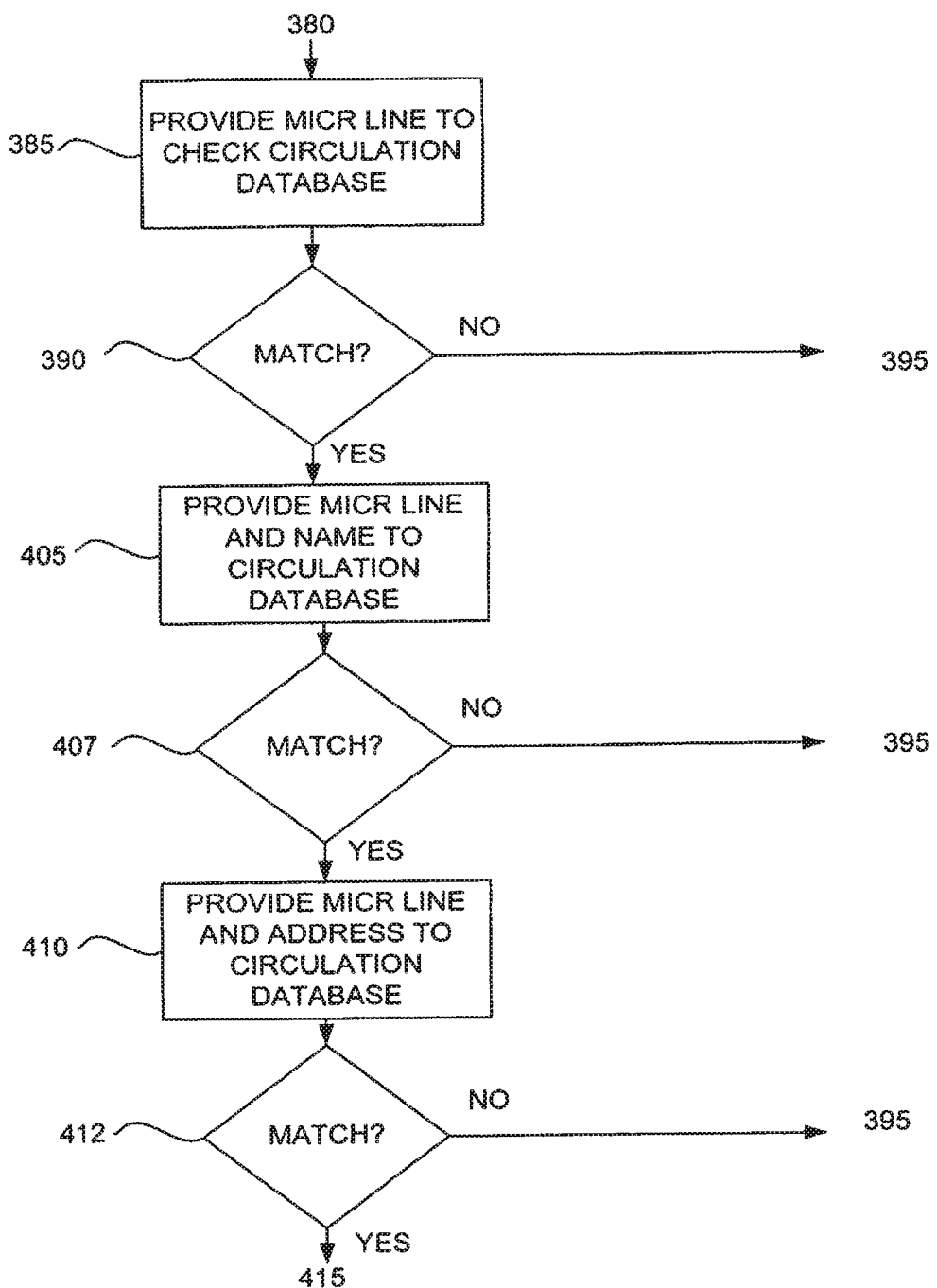
Figure 5D:
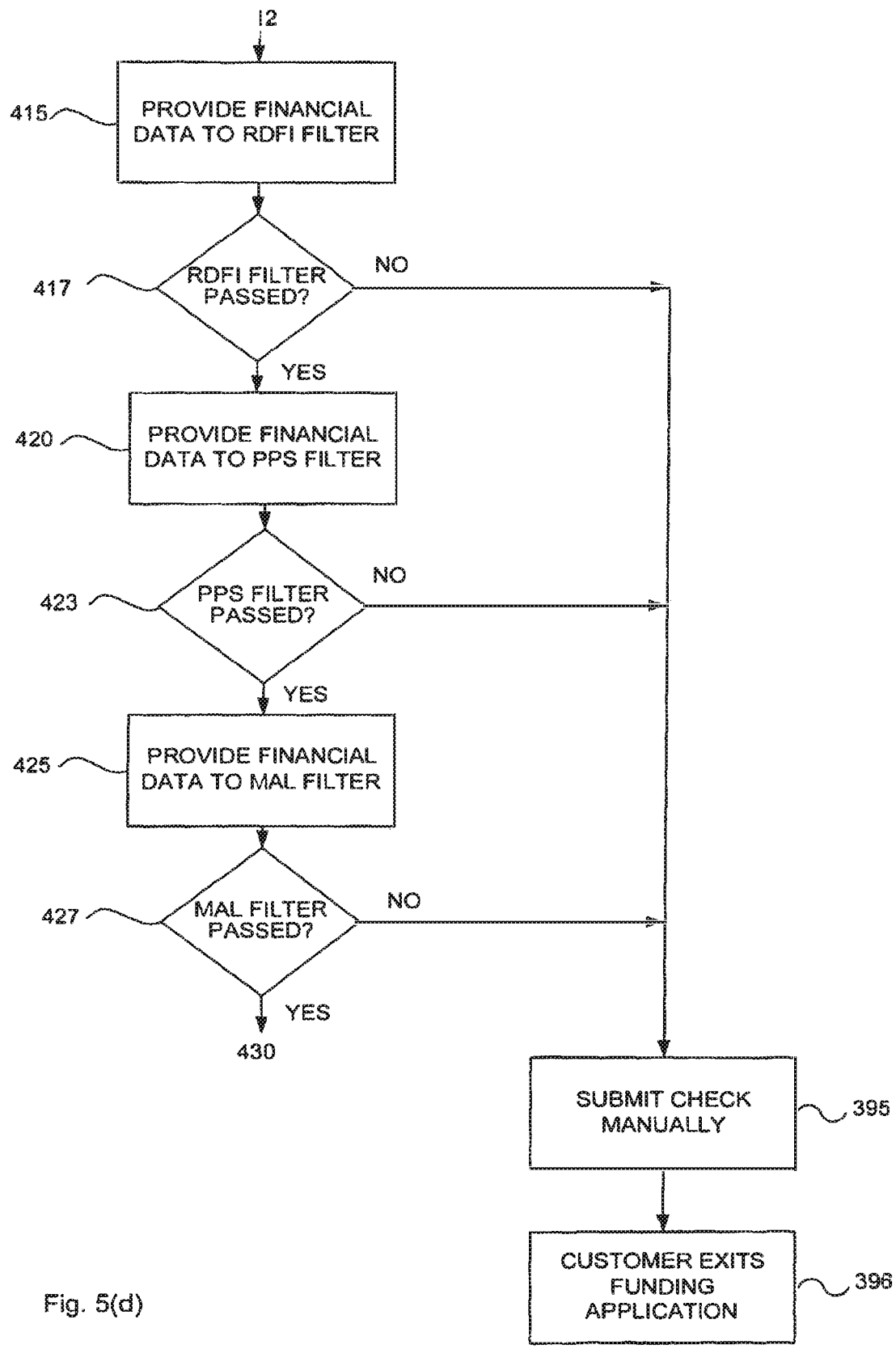

At act 360 (FIG. 5(b)), the customer can activate the cancel button 750. If the customer activates the cancel button, the customer is seamlessly linked out of the funding application to one of the other on-line financial Web pages (act 362). Of course, other terms or words may be used to label the cancel button 750 and the term "Cancel" is only an example of the many labels that could be used.

If the customer does not cancel the transaction, at act 365, the customer can activate the make corrections button 745. If the customer activates the make corrections button 745, the customer is seamlessly linked to the entry screen 600 to reenter or correct any errors the customer found. Of course, other terms or words may be used to label the make corrections button 745 and the term "Make Corrections" is only an example of the many labels that could be used.

At act 370, the customer can activate the authorize funds transfer button 740. If the customer activates the authorize funds transfer button 740, the financial data entered by the customer is transmitted at act 380 from the client 25 to the FI server 35 via the communications network 45. The FI server 35 may analyze or modify the entered financial data, analyze or modify a portion of the entered financial data or, preferably, transmit the entered financial data to the service provider server 30.

Once the service provider server 30 receives the entered financial data, the service provider server 30 validates and assesses the entered information by providing the entered check data to one or more software modules or filters. First, the service provider server 30 validates the association or ownership between the entered financial data with data in the check circulation database 150 (FIG. 4). At act 385 (FIG. 5(c)), the service provider server attempts to find a match between the entered MICR line and a MICR line in the check circulation database 150. Matching the entered MICR line data with a MICR line in the check circulation database 150 validates the presence of a relationship between the entered check data with a check in circulation (i.e., printed). If there is no match (act 390), the service provider server 30 informs the FI server 35 of the result and the FI server forwards a message to the client requesting the customer to submit a check manually (see act 395 of FIG. 5(d)). If there is a match, the service provider server 30 proceeds to act 405.

At act 405, the service provider server 30 attempts to match the entered MICR line and the entered last name with one of the circulation database MICR lines and the associated DDA account last name in the check circulation database 150. Matching the entered MICR line data and the entered last name with the data in the check circulation database validates the presence of a relationship between the entered check data with a check in circulation (i.e., printed). If there is no match (act 407), the service provider server 30 informs the FI server 35 of the result and the FI server forwards a message to the client requesting the customer to submit a check manually (see act 395 of FIG. 5(d)). If there is a match, the service provider server proceeds to act 410.

At act 410, the service provider server 30 attempts to match the entered MICR line, the entered address and the entered ZIP code with one of the circulation database MICR lines, associated DDA address, and associated DDA ZIP code. Matching the entered MICR line data, the entered address and the entered ZIP code with the data in the check circulation database validates the presence of a relationship between the entered check data with a check in circulation (i.e., printed). If there is no match (act 412), the service provider server 30 informs the FI server 35 of the result and the FI server 35 forwards a message to the client requesting the customer to submit a check manually (act 395). If there is a match, the service provider server 30 proceeds to act 415 (FIG. 5(d)). In addition to acts 385,405 and 410, other entered check data or data filters (e.g., phone number or social security number) may be used to validate the check is in circulation and to guard against fraud or identity theft etc. Furthermore, the service provider server 30 does not need to perform each data filter (i.e., acts 385, 405 and 410). However, by performing all three filters, the service provider server 30 increases the accuracy of validating whether the check is in circulation.

At act 415, the service provider server 30 provides the entered MICR line to a receiving depository financial institution (RDFI) filter. The RDFI filter ensures the MICR line entered by the customer is from a member of one of the automated clearing house networks. To accomplish this, the service provider server 30 attempts to match the entered MICR line with one of the MICR lines in the RDFI database 190 (FIG. 4). If there is no match (act 417), the service provider server 30 informs the FI server 35 of the result and the FI server forwards a message to the client 25 requesting the customer to submit a check manually (act 395). If there is a match, the service provider server 30 proceeds to act 420.

At act 420, the service provider server 30 provides the entered MICR data to a primary payment systems (PPS) filter. The PPS filter ensures that the account number entered by the customer is not from an account that is either closed or contains non-sufficient funds (i.e., is NSF). To accomplish this, the service provider server attempts to match the entered account number with one of the account numbers in the PPS database 195 (FIG. 4). If there is a match (act 423), the service provider server 30 informs the FI server 35 of the result and the FI server 35 forwards a message to the client 25 requesting the customer to submit a check manually (act 395). If there is no match, the service provider server 30 proceeds to act 425.

At act 425, the service provider server 30 provides the entered financial data to a maximum authorization limit (MAL) filter. The MAL filter is used to ensure that the entered currency amount does not exceed the threshold level set by the second financial institution 20. To accomplish this, the service provider server 30 compares the entered currency amount with a predefined limit for the second FI 20 from the financial institution profile database 200. If the currency amount is greater than the maximum authorization limit (act 427), the service provider server 30 informs the FI server 35 of the result and the FI server 35 forwards a message to the client 25 requesting the customer to submit a check manually (act 395). If the currency amount is less than the maximum authorization limit, the service provider server 30 proceeds to act 430 (FIG. 5(e)).

Figure 5E:
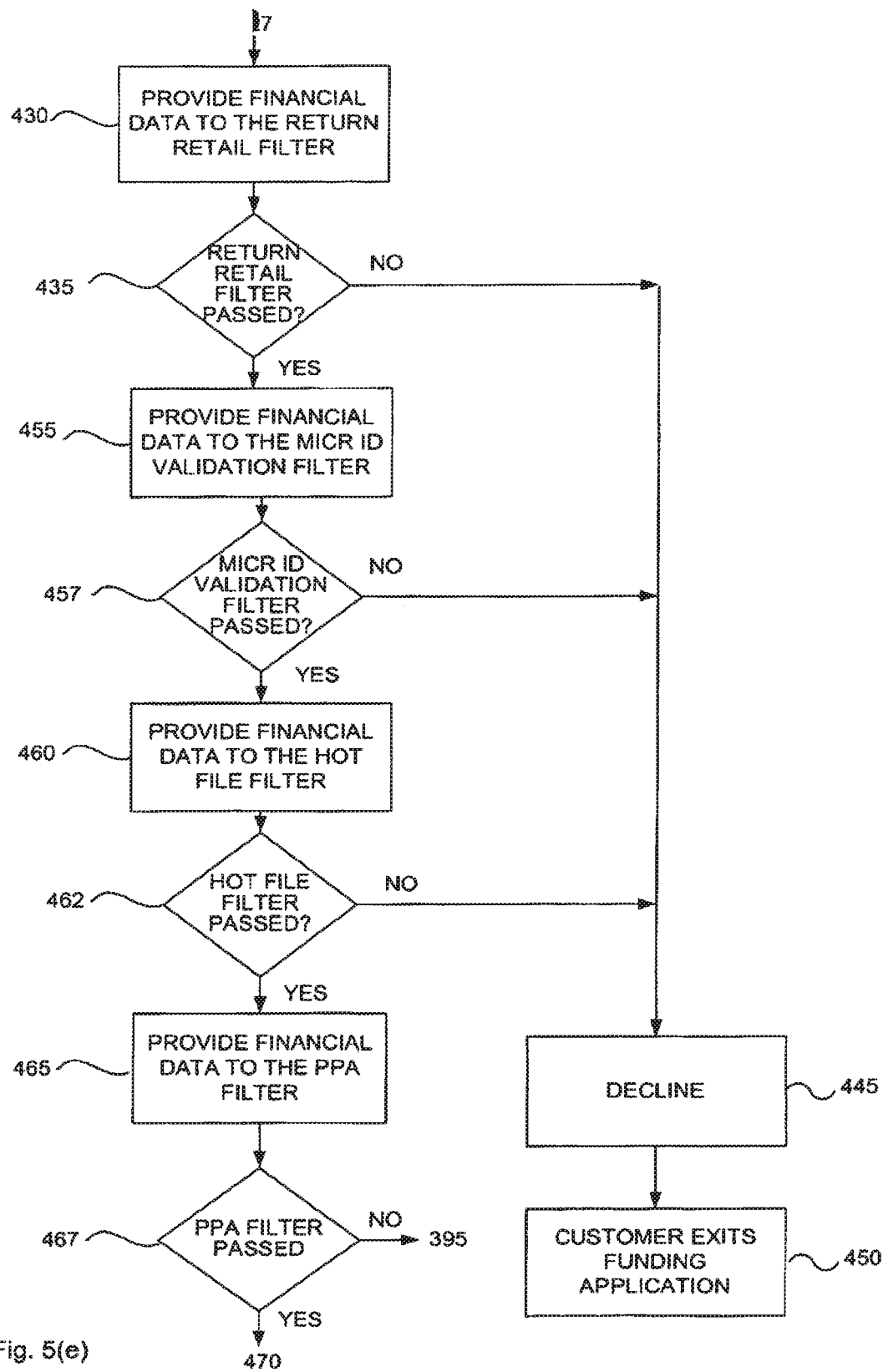
Figure 5F:
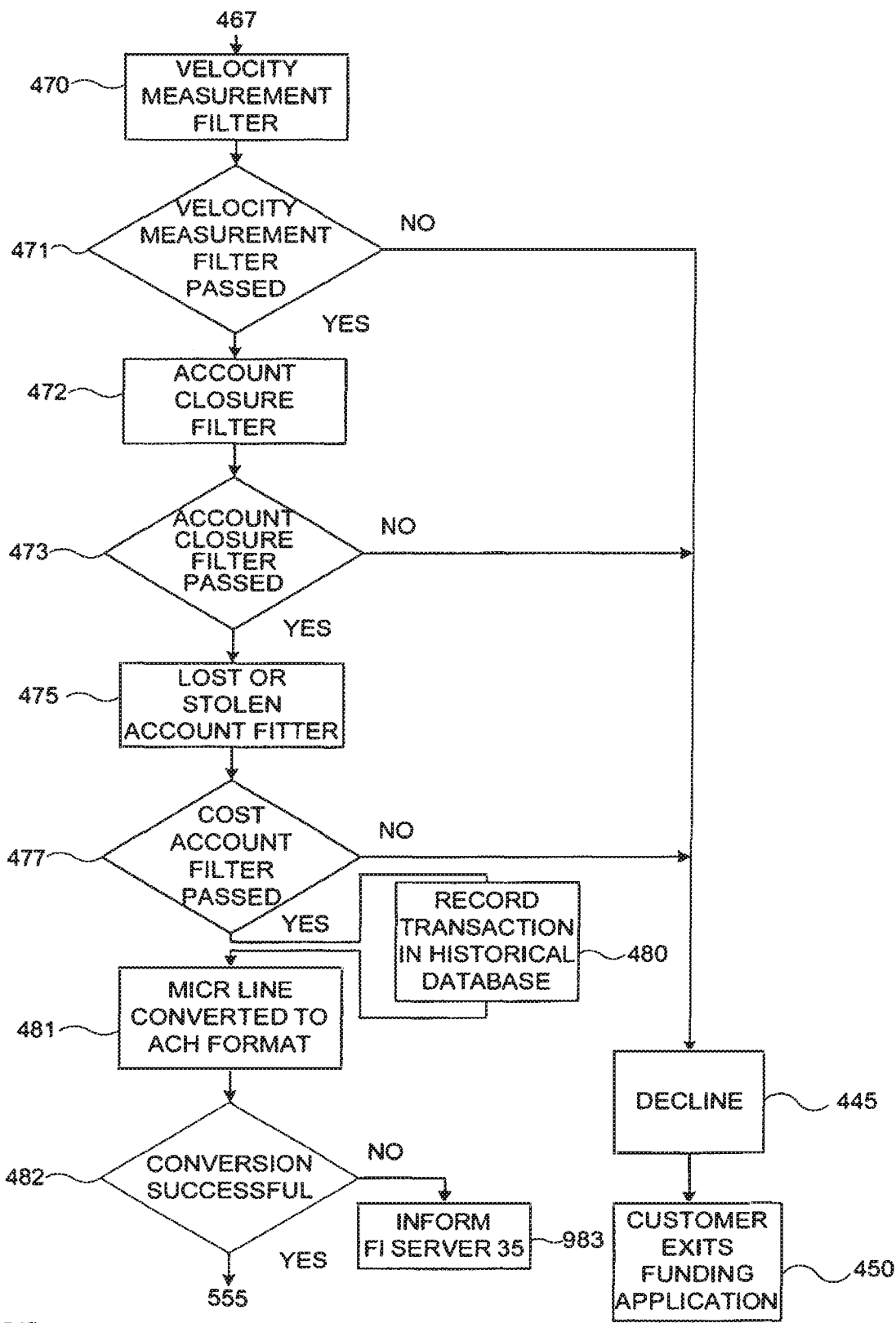
Figure 5G:
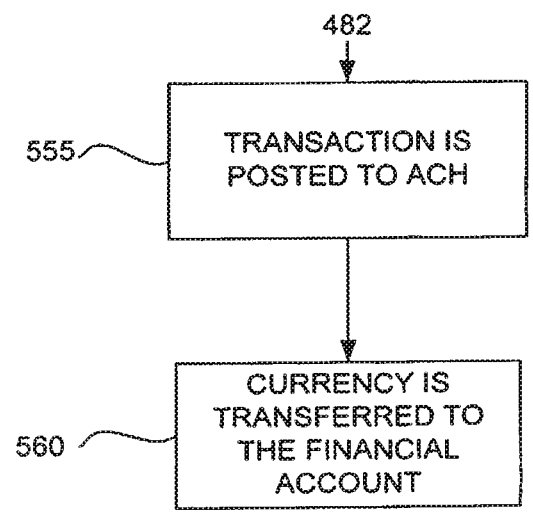

Referring to FIG. 5(e), at act 430, the service provider server 30 provides the entered financial data to a return retail filter. The return retail filter ensures that the entered MICR line is not a MICR line from an account that has previously issued dishonored check(s). To accomplish this, the service provider server 30 attempts to match the entered MICR line against a MICR line in the return retail check database 155. If there is a match (act 435), the service provider server 30 informs the FI server 35 of the result, the FI server 35 forwards a message to the client with a declination response and a copy of the appropriate Fair Credit Reporting Act (FCRA) disclosure language (act 445), and the FI server 35 removes the customer from the funding application (act 450). If there is no match, the service provider server 30 proceeds to act 455.

At act 455, the service provider server 30 provides the entered financial data to a MICR ID validation filter. The MICR ID validation filter verifies the ABA format by ensuring the entered account number has more than two digits, and determines whether the entered account is an ABA assigned account. To accomplish this, the service provider server 30 first verifies the account number has two or more digits, and then attempts to match the entered ABA number with an ABA number in the MICR ID validation database 160. If there is no match or if the account number has less than 3-digits (act 457), the service provider server 30 informs the FI server 35 of the result, the FI server 35 forwards a message to the client 25 with a declination response and a copy of the appropriate Fair Credit Reporting Act (FCRA) disclosure language (act 445), and the FI server 35 removes the customer from the funding application (act 450). If there is a match and the account number has more than two digits, the service provider server 30 proceeds to act 460.

At act 460, the service provider server 30 provides the entered financial data to a hot file filter. The hot file filter enables the second FI 20 to decline transfer of funds from MICR numbers that will result in a declination response. To accomplish this, the service provider server 30 attempts to match the entered MICR number with a MICR number in the "hot" file database 165. If there is a match (act 462), the service provider server 30 informs the FI server 35 of the result, the FI server 35 forwards a message to the client 25 with a declination response and a copy of the appropriate Fair Credit Reporting Act (FCRA) disclosure language (act 445), and the FI server 35 removes the customer from the funding application (act 450). If there is no match, the service provider server 30 proceeds to act 465.

At act 465, the service provider server 30 provides the entered financial data to a permanently protected account (PPA) database filter. The PPA filter validates that the entered MICR number is not related to a check in the PPA database. Examples of MICR numbers in the PPA database include VISA, MasterCard or Discover Card checks, traveler's checks and money orders. To accomplish this, the service provider server 30 attempts to match the entered MICR number with a MICR number in the permanently protected account database 170 of service provider server 30. If there is a match (act 467), the service provider server 30 informs the FI server 35 of the result and the FI server forwards a message to the client requesting the customer to submit a check manually (see act 395 of FIG. 5(*d*)). If there is no match, the service provider server 30 proceeds to act 470 (FIG. 5(*f*)).

At act 470, the service provider server 30 provides the entered financial data to the public or private velocity measurement filter. The velocity measurement filter tracks the activity level of the account based on pre-defined criteria established by the second financial institution 20. For example, the second FI 20 may define criteria that the customer cannot transfer funds to the electronic account from the same DDA in a 24 hour period. Out-of-pattern activity or excessive activity results in a declination response. To accomplish this, the service provider server 30 scans the historical database 205 for past transactions associated with the MICR number. If the found past transactions in combination with the current funding transaction meet the criteria set in the financial institution profile database 200, then an out-of-pattern activity occurs. If an out-of-pattern activity occurs (act 471), the service provider server 30 informs the FI server 35 of the result, the FI server 35 forwards a message to the client 25 with a declination response and a copy of the appropriate Fair Credit Reporting Act (FCRA) disclosure language (act 445), and the FI server 35 removes the customer from the funding application (act 450). If out of pattern activity does not occur, the service provider server 30 proceeds to act 472.

At act 472, the service provider server 30 provides the entered MICR line to an account closure filter. The account closure filter verifies that the entered MICR line is not from an account that was closed for cause (i.e., non-sufficient funds). To accomplish this, the service provider server 30 attempts to match the entered MICR number with a MICR number in the account closure database 180. If there is a match (act 473), the service provider server 30 informs the FI server 35 of the result, the FI server 35 forwards a message to the client 25 with a declination response and a copy of the appropriate Fair Credit Reporting Act (FCRA) disclosure language (act 445), and the FI server 35 removes the customer from the funding application (act 450). If there is no match, the service provider server 30 proceeds to act 475.

At act 475, the service provider 30 provides the entered financial data to a lost or stolen account filter. The lost or stolen account filter compares the entered MICR line with MICR lines that have been reported lost by, or stolen from, the account-holder. To accomplish this, the service provider server 30 attempts to match the entered MICR number with a MICR number in the lost or stolen account database 185. If there is a match (act 477), the service provider server 30 informs the FI server 35 of the result, the FI server 35 forwards a message to the client 25 with a declination response and a copy of the appropriate Fair Credit Reporting Act (FCRA) disclosure language (act 445), and the FI server 35 removes the customer from the funding application (act 450). If there is no match, the service provider server 30 proceeds to act 480.

All of the filters discussed above are modular filters. That is, one or more of the filters may be "turned-off" and/or new filters may be added as appropriate or necessary, depending upon the economic systems in which the financial institutions operate and on the changes within these economic systems. Additionally, the order in which the filters are run is unimportant, and the service provider server 30 may run the filters in any different order than what is described. Even further, although the above description of the filters discusses filtering for the MICR line, one skilled in the art readily understands that the filtering may be performed on the complete MICR line or on a portion of the MICR line (e.g., the transit number and the account number).

At act 480, the service provider server 30 records the funding transaction in the historical database 205. The recorded information may include the entered financial data, the result of the transaction, the reason for declination (if applicable) and the reason for requesting submitting the check manually (if applicable). By recording the funding transaction, new filters can be created or existing filters may be improved or modified. Additionally, storing the transaction allows the second FI 20 to review the transaction at a later date.

If the funding transaction results in no declination responses or does not require the customer to submit a check manually, then the FI server 35 debits the financial account pending the transaction being processed by the ACH network. For this process, the service provider server 30 electronically converts the MICR line to an ACH format (act 481) and presents the transaction to the ACH network 40. The transaction presented to the ACH network 40 includes the MICR data, in an appropriate ACH format, and a transaction amount.

In one embodiment of the invention (shown at act 481), the conversion of the entered MICR line by the service provider server 30 into a format capable with the automated clearing house (ACH) network involves parsing the entered MICR number to obtain a routing number, an account number and a check number. The parsing is achieved based on a dynamically developed software-based "rule" or algorithm established by a system administrator. In one embodiment, a separate "rule" is provided for each MICR routing number, which in turn associates the rule with a given financial institution. In other embodiments, a single rule is developed for all MICR routing numbers. Based on the parsed information, the service provider server converts the information to an ACH format and has an FI originator 42_submit the information to the ACH network 40. If the item (i.e., the submitted information) results in an "Unable To Locate" command, then an operator for the service provider server 30 calls the first FI 15 to request a reason as to why the ACH network was unable to locate the account information. Based on the reason, the item is modified and resubmitted. If the resubmitted item results in an "Able To Locate" result, a new rule is created and tested.

For a specific example, a MICR line of T122100011T O1234 5551212O may be parsed into a routing/transit number of 122100011, an account number of 5551212, and a check number of 1234. If there is no current rule, the item is submitted as is to the ACH network 40 by the FI originator 42. If the item comes back as "Unable To Locate", then an operator for the service provider server 30 calls the first FI 15 and inquires about the reason for the error. For example, the first FI may state that any account numbers having that routing number 122100011 and an account number beginning with 555, must have the routing number changed to 122100025 and have an account number of 51212. Based on the provided information, the item is modified and resubmitted. If the modified item is successful, a new rule is created and tested. If the conversion was not successful (act 482), the service provider server 30 informs the FI server 35. If the conversion was successful, the service provider server 30 proceeds to act 555 (FIG. 5(*g*)).

When the FI originator 42 submits the transaction to the ACH network and the system 10 creates a predefined funds holding window. The holding window is a pre-established time period during which the funds are held in a custodial account to mitigate return risk. The duration of the holding window is based on different criteria including the businesses or individuals involved in the transaction, the amount of the transaction, the risk factor of the transaction (as may be established by various risk assessment filters or software programs) or other criteria. The FI originator 42 transfers the amount of the funds electronically to the custodial account, and the custodial account holds the funds until the hold window expires.

While the funds are being held in the custodial account, the transaction is settled by the first and second FI's through the ACH network. Upon settlement, the currency amount is transferred from the checking account to the financial account (act 560). If the settlement does not result in a transfer of funds, then the second FI 20 is notified so that it can take corrective actions as appropriate.

As can be seen from the description above, the present invention provides a useful and advantageous method of and system for electronically funding a financial account. Moreover, as will be readily understood by those of skill in the art, the system 10 employs a combination of hardware and software components including a software program having various modules for effecting the functions described above. Additionally, the modules of the software program may be stored in computer readable medium at different locations in the hardware components of system 10. For example, a software module for electronically transmitting a funding application to a customer-operated client 25 may be located at the FI server 35 while a software module for validating at least a portion of the entered financial data may be located at the service provider server 30.

Various features and advantages of the invention are set forth in the following claims.

What is claimed is:

1. A system for transferring funds comprising:
a memory storing instructions; and
at least one processor configured to execute the instructions to:
receive, from a client device, a request for a transaction between a first account and a second account;
generate an electronic funding application;
transmit the electronic funding application to a client device, thereby causing the client device to generate a graphical user interface displaying the electronic funding application;
receive, from the client device, financial data entered into the funding application via the graphical user interface, comprising a magnetic ink character recognition (MICR) line, a currency amount, an account identifier associated with the first account, and a customer name;
validate at least a portion of the financial data by:
searching a database having a plurality of records using the received financial data, and;
matching a record of the database based on at least a portion of the entered MICR line,
convert the entered MICR line to an item compatible with an automated clearing house (ACH) network;
based on whether the conversion is successful, submit the item and the currency amount to the ACH network;
transfer the currency amount from the first account to a custodial account, wherein the custodial account is valid during a predetermined holding window;
settle the transaction through the ACH network; and
upon settlement, transfer the currency amount from the custodial account to the second account.

2. The system of claim 1, wherein transmitting the funding application is performed via the Internet.

3. The system of claim 2, wherein the funding application is Internet-based.

4. The system of claim 1, wherein the client is at least one of a personal computer, an Internet appliance, or a wireless device.

5. The system of claim 1, wherein the account identifier is at least one of an account name, an account address, or an account phone number.

6. The system of claim 1, wherein transmitting the financial data to a server is performed via the Internet.

7. The system of claim 1, wherein the stored MICR lines correspond to at least one of MICR lines of checks, MICR lines of closed accounts, MICR lines issued from automated clearing house networks, MICR lines of dishonored checks, protected MICR lines, or MICR lines known to result in declination.

8. The system of claim 1, wherein validating the financial data comprises:
    searching a database having a plurality of records, the records having a stored account identifier, using the entered account identifier.

9. The system of claim 8, wherein the stored account identifiers correspond to account identifiers of checks in circulation.

10. The system of claim 1, wherein the at least one processor is further configured to execute the instructions to:
    receive a denial upon submitting the item and the currency amount to the ACH network;
    determine the cause of the denial;
    convert the MICR line to a second item compatible with the ACH network using a conversion rule based upon the cause of the denial; and
    submit the second item and the currency amount to the ACH network.

11. A method for transferring funds performed by at least one processor configured to execute instructions, the method comprising:
    receiving, from a client device, a request for a transaction between a first account and a second account;
    generating an electronic funding application;
    transmitting the electronic funding application to a client device, thereby causing the client device to generate a graphical user interface displaying the electronic funding application;
    receiving, from the client device, financial data entered into the funding application via the graphical user interface, comprising a magnetic ink character recognition (MICR) line, a currency amount, an account identifier associated with the first account, and a customer name;
    validating at least a portion of the financial data by:
        searching a database having a plurality of records using the received financial data, and;
        matching a record of the database based on at least a portion of the entered MICR line,
    converting the entered MICR line to an item compatible with an automated clearing house (ACH) network;
    based on whether the conversion is successful, submitting the item and the currency amount to the ACH network;
    transferring the currency amount from the first account to a custodial account, wherein the custodial account is valid during a predetermined holding window;
    settling the transaction through the ACH network; and
    upon settlement, transferring the currency amount from the custodial account to the second account.

12. The method of claim 11, wherein transmitting the funding application is performed via the Internet.

13. The method of claim 12, wherein the funding application is Internet-based.

14. The method of claim 11, wherein the client is at least one of a personal computer, an Internet appliance, or a wireless device.

15. The method of claim 11, wherein the account identifier is at least one of an account name, an account address, or an account phone number.

16. The method of claim 11, wherein transmitting the financial data to a server is performed via the Internet.

17. The method of claim 11, wherein the stored MICR lines correspond to at least one of MICR lines of checks, MICR lines of closed accounts, MICR lines issued from automated clearing house networks, MICR lines of dishonored checks, protected MICR lines, or MICR lines known to result in declination.

18. The method of claim 11, wherein validating the financial data comprises searching a database having a plurality of records, the records having a stored account identifier, using the entered account identifier.

19. The method of claim 18, wherein the stored account identifiers correspond to account identifiers of checks in circulation.

20. The method of claim 11, further comprising:
    receiving a denial upon submitting the item and the currency amount to the ACH network;
    determining the cause of the denial;
    converting the MICR line to a second item compatible with the ACH network using a conversion rule based upon the cause of the denial; and
    submitting the second item and the currency amount to the ACH network.

* * * * *